(12) United States Patent
Ringer

(10) Patent No.: US 9,841,118 B2
(45) Date of Patent: Dec. 12, 2017

(54) MANUAL RESET HYDRAULIC VALVE LATCH FOR A HYDRAULICALLY CONTROLLED VALVE

(71) Applicant: Yoram Ringer, Providence, RI (US)

(72) Inventor: Yoram Ringer, Providence, RI (US)

( * ) Notice: Subject to any disclaimer, the term of this patent is extended or adjusted under 35 U.S.C. 154(b) by 15 days.

(21) Appl. No.: 14/986,439

(22) Filed: Dec. 31, 2015

(65) Prior Publication Data

US 2016/0195196 A1    Jul. 7, 2016

Related U.S. Application Data

(60) Provisional application No. 62/100,463, filed on Jan. 6, 2015.

(51) Int. Cl.
| | | |
|---|---|---|
| *A62C 35/68* | (2006.01) | |
| *F16K 31/128* | (2006.01) | |
| *F16K 31/524* | (2006.01) | |
| *F16K 11/16* | (2006.01) | |

(52) U.S. Cl.
CPC ............ *F16K 31/128* (2013.01); *A62C 35/68* (2013.01); *F16K 11/161* (2013.01); *F16K 31/52408* (2013.01); *Y10T 137/2544* (2015.04); *Y10T 137/2665* (2015.04)

(58) Field of Classification Search
CPC ... A62C 35/62; A62C 35/68; Y10T 137/2665; Y10T 137/2544; Y10T 137/2607
See application file for complete search history.

(56) References Cited

U.S. PATENT DOCUMENTS

| 3,269,157 | A | * | 8/1966 | Ashley | D06F 47/00 100/211 |
|---|---|---|---|---|---|
| 4,287,906 | A | * | 9/1981 | Green | B60S 1/105 137/118.02 |
| 4,303,088 | A | * | 12/1981 | Green | B60S 1/48 137/102 |
| 5,927,406 | A | * | 7/1999 | Kadoche | A62C 35/62 169/17 |
| 6,068,057 | A | * | 5/2000 | Beukema | A62C 35/62 169/17 |
| 6,158,520 | A | * | 12/2000 | Reilly | A62C 35/68 169/17 |
| 6,378,616 | B2 | * | 4/2002 | Reilly | A62C 35/62 169/17 |
| 6,536,533 | B2 | * | 3/2003 | Reilly | A62C 35/62 169/16 |
| 2016/0279454 | A1 | | 9/2016 | Ringer et al. | |

OTHER PUBLICATIONS

Information page, Bermad Easylock, Bermad CS Ltd, Bermad Israel (c) 2007-2012, Rev. 1, Mar. 2016.

\* cited by examiner

*Primary Examiner* — Kevin Murphy
(74) *Attorney, Agent, or Firm* — Shalom Wertsberger; Saltamar Innovations

(57) ABSTRACT

A Manual Reset hydraulic valve latch, capable of maintaining a hydraulically controlled valve in an open state after the valve has been opened by an activating device, regardless of the state of the activating device, until the latch is reset. The invention provides simplicity of operation, high resistance to false tripping and accidental shutoff. The invention further provides a fast fill of the hydraulic valve control chamber by reducing flow restriction into the valve control mechanism during reset of the latch.

13 Claims, 8 Drawing Sheets

MANUAL RESET HYDRAULIC VALVE LATCH FOR A HYDRAULICALLY CONTROLLED VALVE

FIELD OF THE INVENTION

The present invention is directed generally to improvements in based fire protection systems, and more particularly to hydraulic reset latches coupled to hydraulically controlled valves.

BACKGROUND OF THE INVENTION

The field of fire protection presents several problems to the designer of major valves utilized in such systems. The high fluid volume required to overcome fires dictate large pipe and valve diameters, which in turn translates to a need to control large operating pressures. To reduce the forces required to transition a valve from a closed to open state (and in certain cases from open to closed state) hydraulic valves have been developed. In a hydraulic valve, pressure is applied to a control chamber, and is applied to a sealing member. Release of the pressure causes the sealing member to open, and allow distribution of the primary firefighting fluid into the firefighting system. A base valve may be utilized for different functions and/or systems, such as deluge, wet system, dry/pre-action valves, pressure reducing, deluge reducing and deluge on/off applications. The base valve is configured to fulfill those varied functions by external connections and components, collectively known as 'trim'.

The base valve has at least a valve body, an inlet in fluid communication with an inlet chamber which can hold a fluid supply, and an outlet chamber which can receive fluid from the inlet chamber and controllably pass the fluid to an outlet. The fluid in the input will be referred to herein as a 'primary' fluid. A valve may be in a "closed", (equivalently known as "standby") state where the valve impedes flow of fluid between the inlet and outlet, and an "opened", (equivalently known as "activated") state in which fluid communication is established between the input and output chambers, and fluid is allowed to flow between the input and the output.

For various reasons that will be explained below, If a firefighting system base valve is activated due to fire, there is a risk that the valve will be closed, unless a latch mechanism is provided to maintain the valve in an open state as long as it is needed, and allow a relatively simple and efficient reset operation. Various embodiments of the present invention are directed to providing a latch for that purpose, and more particularly to a latch involving fluid and fluid pressure manipulation to achieve the desired result Such a latch will be referred to hereinunder as a hydraulic latch, manual reset device, (equivalently referred to as a latch, for brevity).

Nowadays diaphragm valves are in common use and for brevity and simplicity of understanding of the principles of the present invention, such valves will be utilized by way of example in these specifications; however the skilled in the art will readily recognize that the principles disclosed herein are applicable to any hydraulic valve having a control chamber.

FIG. 1 depicts an isometric view of a common diaphragm valve 10, an hydraulic latch 12, and an activating device 14. Notably, while the hydraulic latch 12 shown in the drawing may be any type of hydraulic latch, the drawing depicts one embodiment of the present invention.

The valve 10 in the example acts as the base valve of a fire fighting system, and comprises an inlet chamber 102 and an outlet chamber 104, separated by diaphragm 100. The diaphragm has a bottom surface 106 and a top surface 108, the top surface forms a part of a diaphragm chamber 110. The top surface of the diaphragm is exposed to the pressure in the diaphragm chamber 110, which acts as a control chamber. During the system standby state the valve impedes water flow. The top surface 108 of the diaphragm is exposed to the pressure of the fluid in the control chamber. If the pressure in the inlet chamber is equal to the pressure in the diaphragm chamber the valve is in standby (equivalently referred to as closed) state. The valve is closed because a larger area of the diaphragm top surface 106 is exposed to fluid pressure than the area exposed to the fluid pressure at the bottom surface of the diaphragm 108 (any force from the outlet chamber is considered negligible in this example). Thus the diaphragm exerts pressure on a bridge section 103 which separates the inlet chamber and the outlet chamber, and forms a seal therebetween. If the pressure in the diaphragm chamber is reduced to the point that the force exerted by it on the diaphragm is lower than the pressure exerted on the diaphragm by the fluid in the inlet chamber, the diaphragm will be pushed away from the bridge, allowing fluid to flow between the inlet and outlet chambers, and the valve is thus in the 'open' state. It is seen therefore that the pressure in the diaphragm chamber controls the operation of the valve, and thus the diaphragm chamber acts as a control chamber to control the valve state. Other mechanisms of control chamber operated valves abound, and the invention extends thereto.

It is common to couple fluid from the primary fluid supply to the control chamber 110. However the pressure supplied to the control chamber may come from any desired source, and does not have to come from the fluid supply side of the firefighting system. However the arrangement of supplying the fluid from the system supply side is one of the most common embodiments today, therefore these specifications shall use such an arrangement by way of example.

It is common to supply the primary fluid to the control chamber via a fluid path that offers a certain flow restriction 112, and to activate the valve by allowing the fluid to drain out of the control chamber via a less restrictive fluid path 114. The more restricted path 112 providing pressure to the valve control chamber will be referred to as the control supply path, and the lower restriction path 114 which is utilized to relieve the pressure from the valve control chamber by the activating device 14 will be referred to as the activating path.

The pressure in the control chamber (such as in the diaphragm chamber of a diaphragm valve) is controlled by an activation device 14 which controls flow in the activating path. Under normal conditions, when the valve is in standby mode, the activating device is closed, and the pressure in the base valve 10 control chamber is kept at sufficient level to maintain the valve in closed state. When a fire is detected, the activation device opens, providing pressure relief to the fluid in the control chamber via the activating path, which in turn allows the valve 10 to change to an open state. As the activation path offers lower flow resistance than the control supply path, the pressure in the control chamber will be sufficiently low to keep the base valve open, as long as the activation device 14 is open. However if the activating path 114 becomes more restrictive that the control supply path 112, the fluid from the control supply path will pressurize the control chamber and force the base valve 10 to close.

Common embodiments of the activating devices include a solenoid, a dry pilot actuator, and the like.

Dry pilot devices rely on lose of pressure in the distribution system connected downstream from the base valve, to activate the valve. In certain systems a low pressure fluid is contained in the distribution system and when this pressure is released a fire is assumed, and a dry pilot devices which senses the pressure drop activates the base valve. Dry pilot valves are considered reliable without the need for electrical current, however they are susceptible to closing due to pressure buildup in the distribution system by the incoming primary fluid. An example of a dry pilot valve, and a limited function latch, is disclosed in U.S. Patent Publication 2014/0182865 to the present inventor, which is incorporated herein by reference.

Many activation devices 14 depend directly or indirectly on electrical power. Voluntary or involuntary loss of electrical power is extremely common in case of fire. There is therefore a high risk that the activation device will stop operating due to loss of electric power, or due to re-pressurization in the case of a dry pilot valve. Such stoppage will close the activation path pressurizing of the diaphragm chamber, and as pressure builds up in the control chamber from the control supply path, the valve will again transition to a closed state, cutting fluid flow to the system when it is most needed.

To mitigate this risk, the activation device may be coupled to the valve via the latch. The latch 12 acts to control pressure transfer from the system input to the control chamber. As a general rule, after the base valve 10 is activated, i.e. transitions to an open state, the latch acts to block pressure rebuilding in the control chamber 110, and requires a manual operation in order to reset the state of the base valve, regardless of the state of the activation device 14.

Several latch mechanisms are known in the art. By way of example Bermad Water Control Solutions (Kibutz Evron, Israel), and Inbal Valves of Rishon LeZion Israel make latch devices. Those devices rely on blocking fluid supply to the control chamber after the valve is activated. Solution based solely on closing the water supply to the control chamber has several drawbacks, most significant of which is the risk of even a small leak in the latch may re-close the base valve 10 after the activation device has been closed. Additionally, a system fluid shock wave (known in common parlance as 'water hammer'), which will cause the force exerted on the diagram bottom by the pressure wave to exceed the force exerted from the control chamber, causing false tripping.

Thus there is a clear, yet heretofore unresolved need, for a positive resetting activated hydraulic latch that will ensure that after activation of a valve in a fire fighting system only manual operation will allow closure of the valve.

SUMMARY OF THE INVENTION

The present invention is directed to providing a latch that allows a control chamber equipped valve to remain open after being activated, until a reset of the latch mechanism occurs. Furthermore the latch allows for rapid filling of the control chamber during a reset.

To that end there is provided a latch mechanism having a standby state, an active (equivalently denoted as activated) state, and a reset state, the latch comprising a latch body having an input port, an activation port, a control output port, and a drain port. The ports are in fluid coupling with a latch chamber formed at least partially within the latch body. The latch has a plunger with at least a portion thereof disposed in the body; the plunger is movable between at least a standby position and a reset position, the plunger in the reset state places the latch in a reset state. A drain seal is disposed to move between a closed position where the drain seal impedes fluid flow between the latch chamber and the drain port, and an open position wherein the drain seal allows fluid flow from the latch chamber and the drain port. The drain seal has a sealing surface and a top surface exposed to pressure within the latch chamber. The drain seal is urged to the open position by a drain seal opener such as a spring. The drain seal is disposed such that placing the plunger in a reset position will urge the drain seal to the closed state. In standby state the seal is held in a closed position by pressure in the latch chamber, which acts against the seal opener.

A variable flow restrictor is disposed to variably impede fluid flow from the inlet into the latch chamber, the restrictor presenting a lower flow resistance when the plunger is in reset state, than when the plunger is in standby state. The restrictor is having a fluid path therethrough at least during standby and reset states.

In certain embodiments the flow restrictor is integral in the latch, in other embodiments the flow restrictor is embodied by a separate valve outside the latch body, and in certain embodiments the restrictor comprises a combination of integral and external restrictor. However a key feature of the restrictor is that it, as a whole, constructed to vary the fluid flow therethrough such that it allows more fluid to flow therethrough when the latch is in the reset state than when the latch is in the standby or active state. The flow restrictor is directly or indirectly coupled to the plunger at least when the plunger is in the reset state.

by way of non-limiting examples, the restrictor may comprise a check valve, a needle valve, a reed, a gate valve, and the like, and a combination integral/external restrictor may comprise a restricting orifice integral to the latch, and a valve bypassing the orifice, wherein the valve is coupled to the latch reset mechanism, such as the plunger, and activated thereby.

SHORT DESCRIPTION OF DRAWINGS

The summary above, and the following detailed description will be better understood in view of the enclosed drawings which depict details of preferred embodiments. It should however be noted that the invention is not limited to the precise arrangement shown in the drawings and that the drawings are provided merely as examples.

Figure 6:
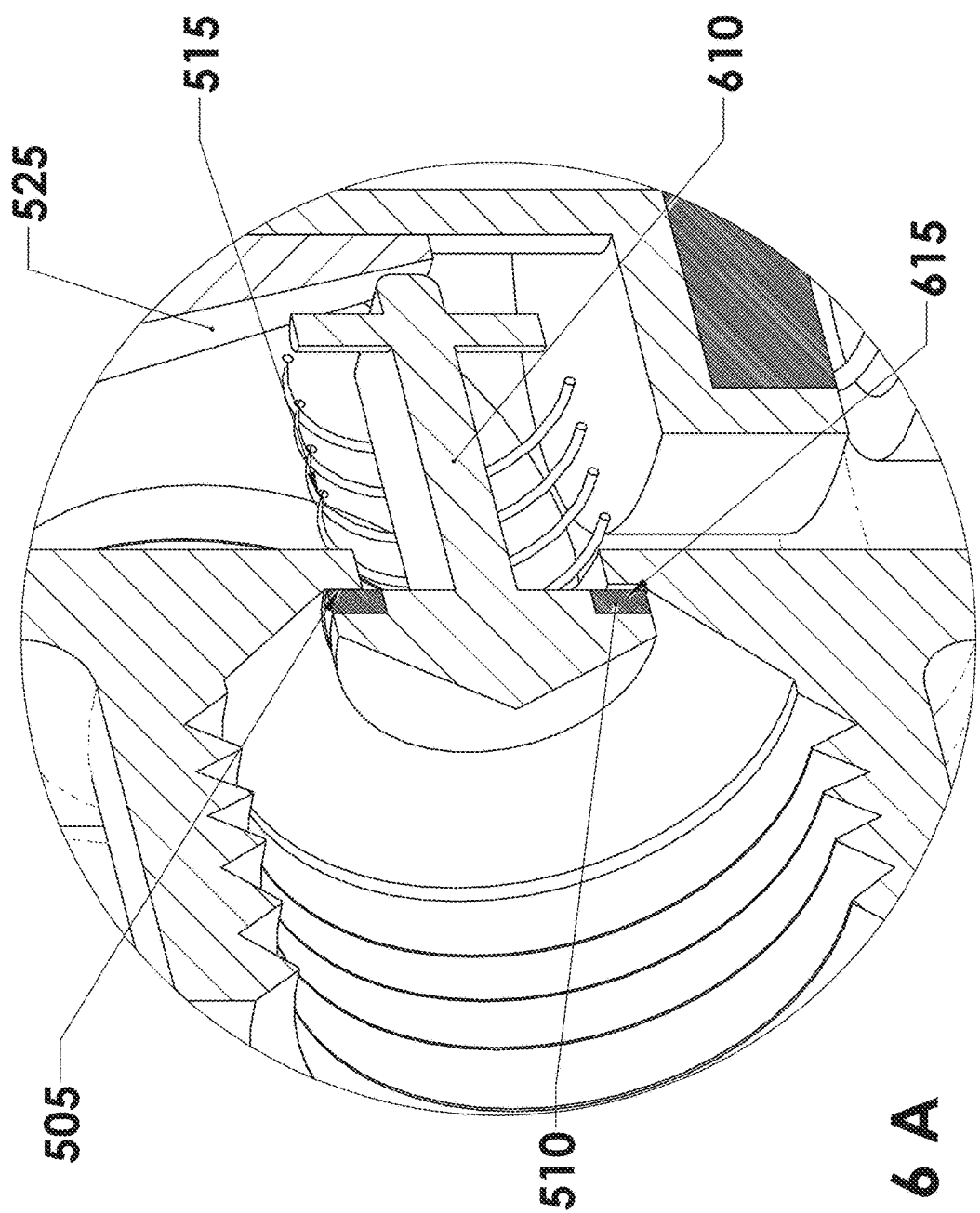
Figure 6:
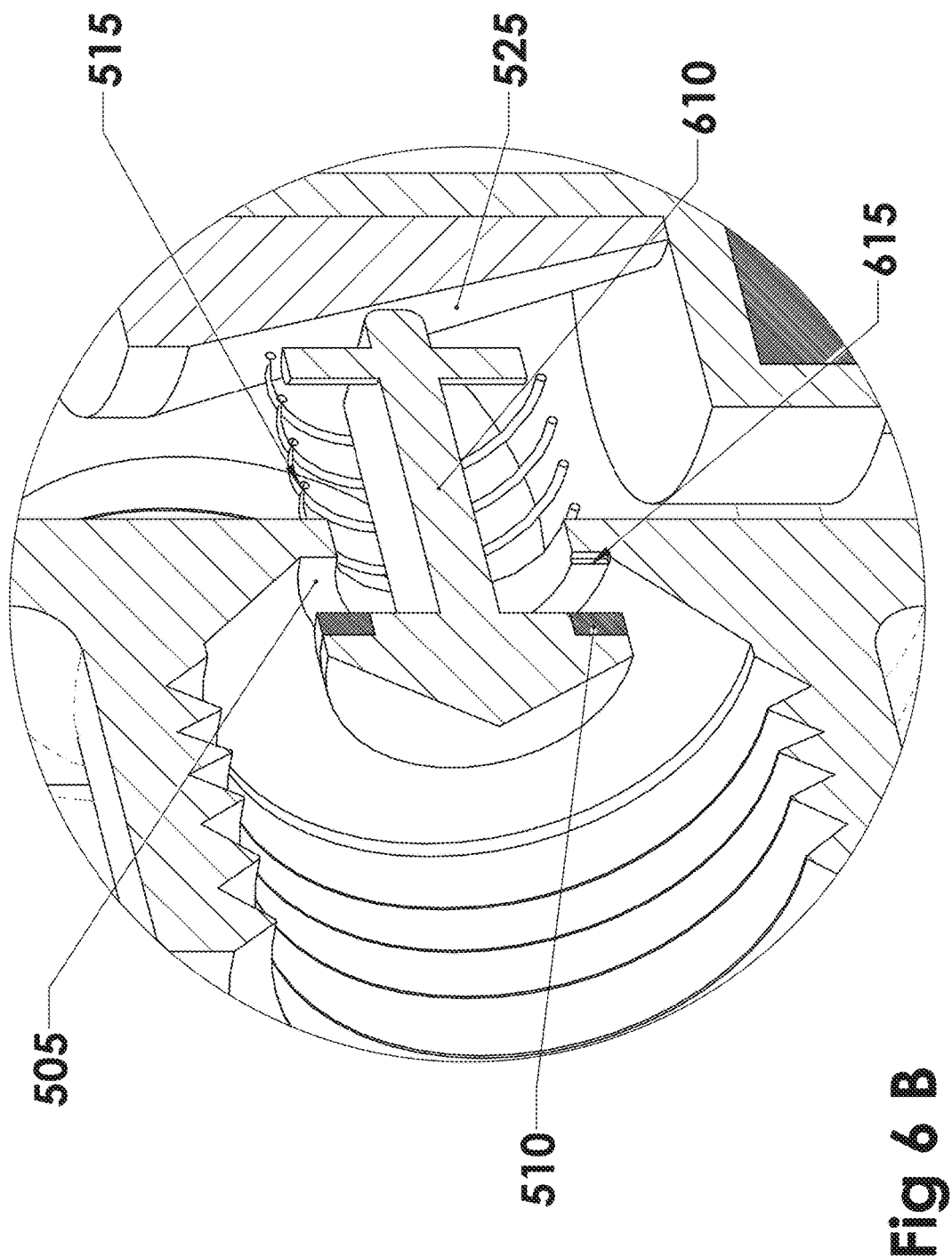

FIGS. 6 A and B depicts a close-up of an optional arrangement of a variable restrictor where FIG. 6A shows the restrictor in standby state, and FIG. 6B depicts the restrictor in a reset state.

Figure 7:
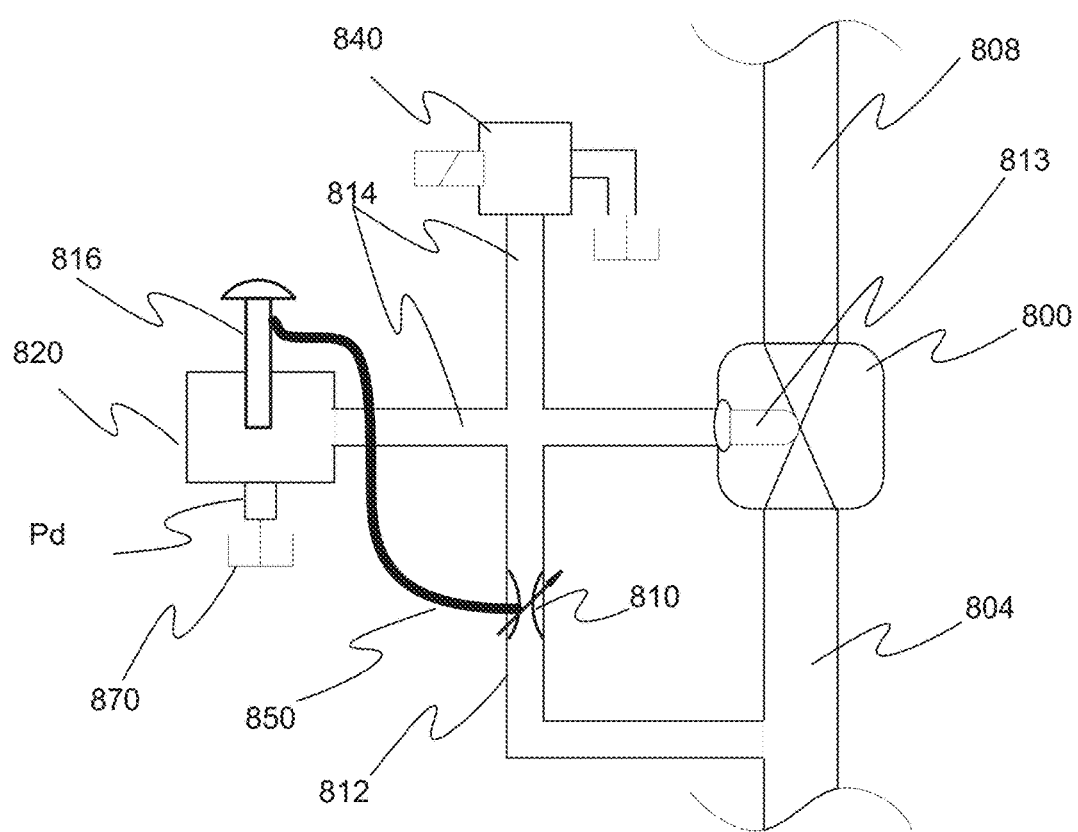

FIG. 7 depicts a simplified diagram showing various portions of the invention embodied in discrete units.

DETAILED DESCRIPTION

Figure 1:
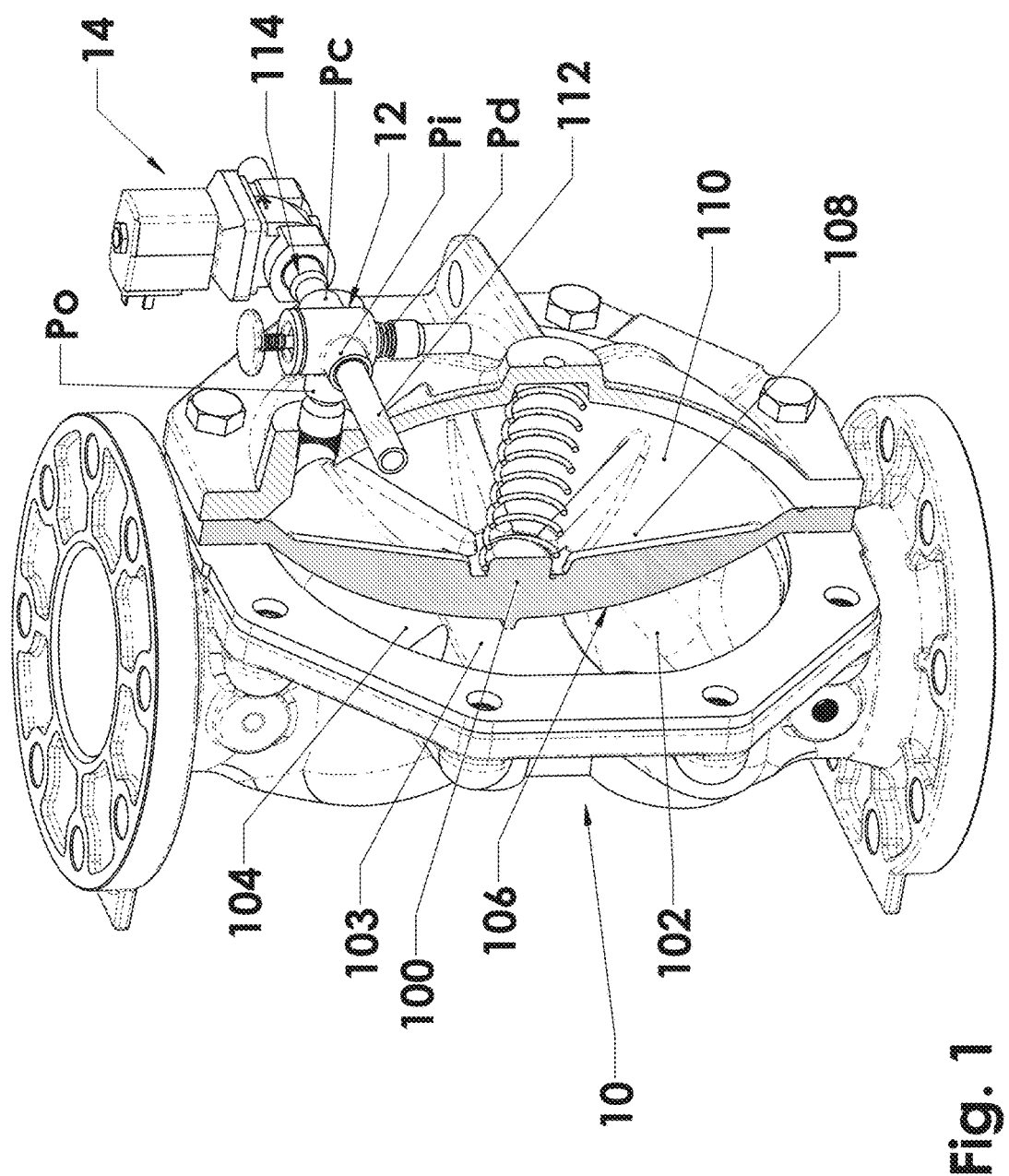
FIG. 1 depicts a simplified fluid control system showing a control chamber operated base valve, a hydraulic latch, and an activating device.
Figure 2:
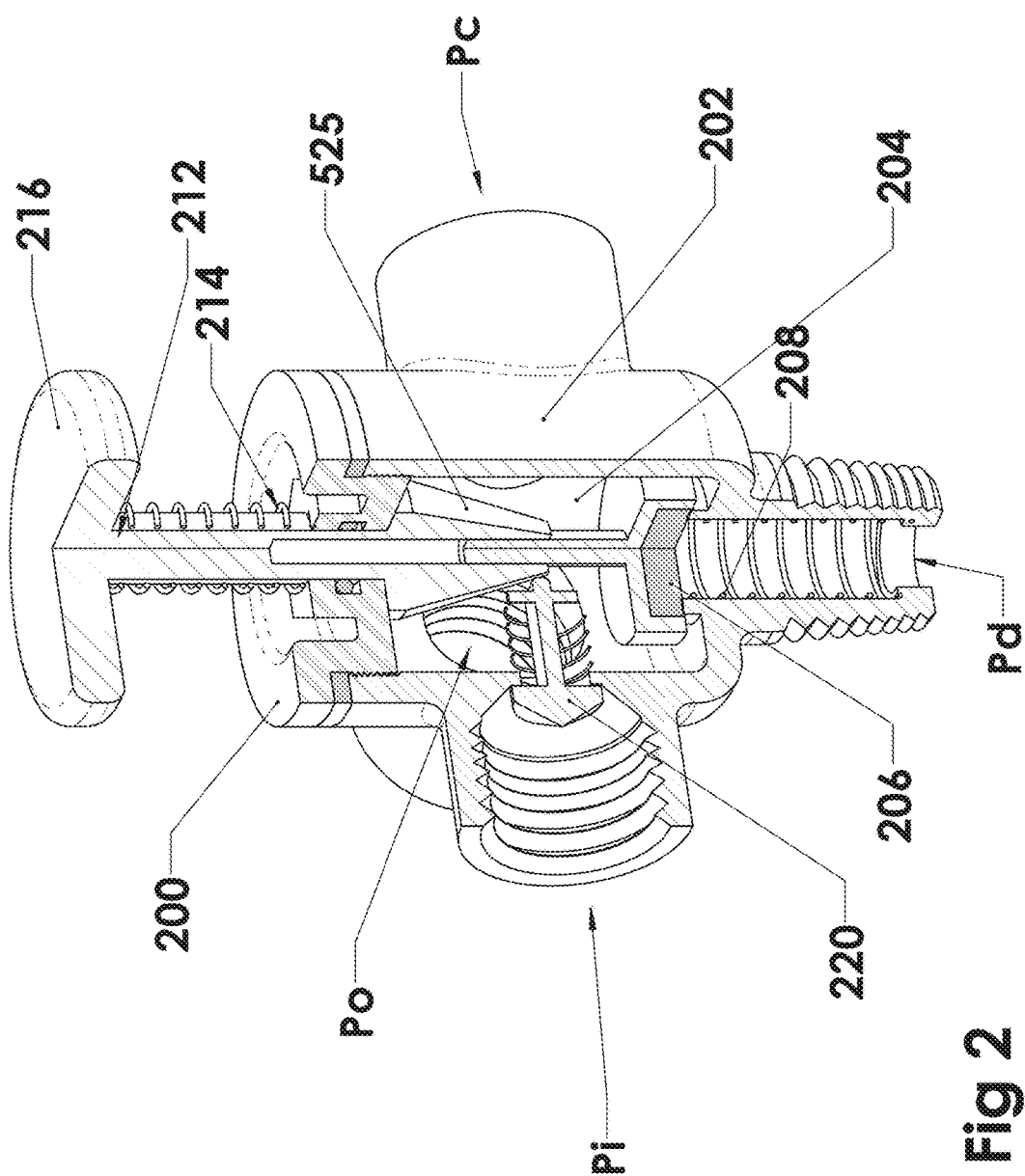
FIG. 2 depicts an isometric, quarter cut, view of an embodiment of a latch according to the present invention, shown in standby state.

FIG. 2 depicts an isometric view of a latch arranged according an example embodiment of the invention, shown with a quarter of the latch body removed, for clarity. The latch is shown in the standby state. The latch 200 has a body 202 which defines a latch chamber 204. Four ports are in fluid communications with the latch chamber: an inlet port Pi, an outlet port Po, a control port Pc, and a drain port Pd. A variable restriction exists between the inlet port and the latch chamber.

Drain port Pd may be open to the ambient environment, or coupled to any convenient drain. In certain embodiments the drain port is also coupled to an alarm activating sensor. A drain seal 206 is disposed in the latch chamber 204. The drain seal may be moved at least between a closed position, in which it impedes fluid flow from the latch chamber to the drain port, and an open position, that allows relatively free flow of fluid from the latch chamber and the drain port. A drain port opener, depicted as a spring 208 in FIG. 2, exerts pressure against the drain seal and urges it towards an open position. In FIG. 2 the drain seal is shown in the closed position.

A plunger 212 is disposed at least partially in the latch chamber. In many embodiments a portion of the plunger extends outside the latch chamber. The plunger is moveable at least between two positions: a standby position and a reset position. In normal operation, when the valve 10 is closed, the plunger is in the standby position and the latch is considered in standby mode. When the plunger is in the reset position the latch is considered to be in the reset state. Commonly but not necessarily, the plunger is also in the standby position when the latch is in an activated state. A portion of the plunger is disposed to exert force on the drain seal 206, to urge it towards a closed position when the plunger is in the reset position. The plunger is coupled to the variable restrictor such that positioning the plunger in the reset position also allows larger fluid flow via the restrictor. In many embodiments the plunger is not stable in the reset state, and will be disposed to revert to the standby state without an activating force. By way of example in FIG. 2 a push on plunger button 216 will urge the plunger to a reset state, however spring 214 urges the plunger to the standby position and thus, the latch reset state is momentary, and the plunger shall revert to its standby state when the button is released.

Variable restrictor 220 is disposed to provide a restriction of the fluid flow from the inlet. Moving the plunger to the reset state operates the restrictor such that it presents higher fluid flow in the reset state than in the standby state. Stated differently, the restrictor presents lower resistance to fluid flow when the latch is being reset, than the resistance it presents in the standby state. It is noted that the plunger does not have to be moved completely from the reset state and any number of plunger states other than the standby state may be utilized, and those are considered to be equivalent if they vary the restriction such that when activated by the plunger the restrictor allows higher fluid flow than when the plunger is in the reset state. The variable restrictor in most embodiments offers a leaking seal. In certain embodiments a portion of the restrictor offers a complete seal, but a certain portion offers a fluid path from the inlet port Pi to the latch chamber. By way of non-limiting example an orifice or other high impedance flow orifice or passage may be installed in parallel to a valve or a seal, and the combination forms the restrictor. Such orifice may be formed integrally to the latch or be implemented external thereto. Such embodiment may utilize an orifice, a narrow pipe, and the like. In certain embodiments a check valve, a needle valve, a gate valve, and the like is utilized as the restrictor. Yet another known variable restrictor is constructed by disposing a tapered needle in a corresponding tapered passage, such that the needle is longitudinally movable relative to the tapered passage, thereby changing the open surface therebetween and correspondingly the flow restriction. It is noted that the restrictor may be embodied outside the latch, and in such case it will be coupled to the reset mechanism of the latch. The coupling may be mechanical, hydraulic, electric and the like.

An explanation of the principle of operation of the latch follows below.

Figure 3:
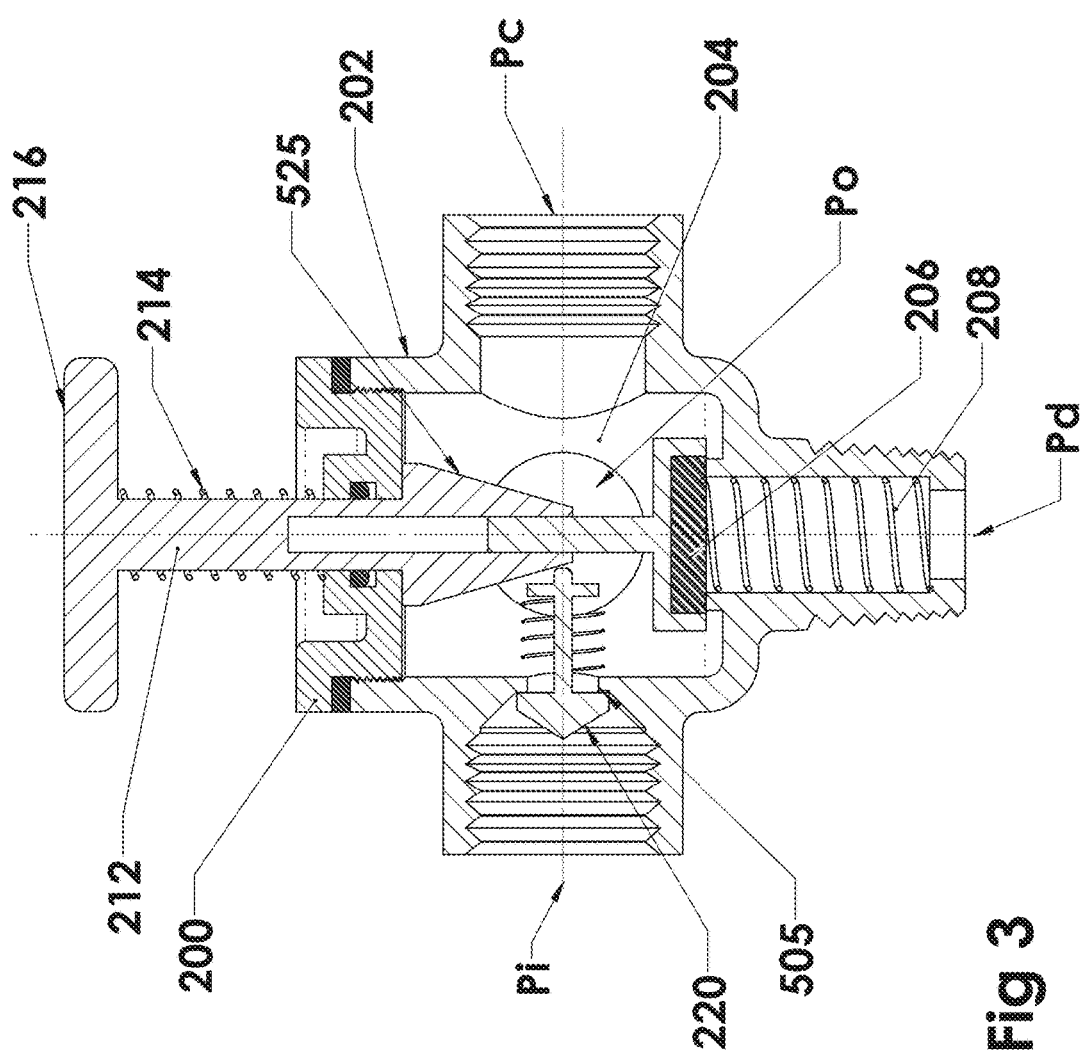
FIG. 3 depicts a cross-cut of the latch of FIG. 2 in standby state.

FIG. 3 depicts a cross section of the latch shown in FIG. 2 in standby state. Drain port Pd is closed, and since the activation device 14 is also closed and is in fluid coupling with the control port Pc, control port Pc may be considered closed as well. Pressure in the inlet port Pi and the latch chamber is substantially the same, and as the control chamber of the base valve 10 is in fluid coupling to the latch chamber via the outlet port Po, the control chamber pressure may be considered as being at the same pressure as the latch chamber, and the inlet port. As explained above, this causes the base valve to be closed.

In standby state the pressure in the latch chamber 204 also operates to urge the drain seal 206 towards the closed position, and against the drain port opener 208. Under normal operating conditions in standby mode, the force exerted by the pressure in the latch chamber on the drain seal is larger than the force exerted on the drain seal by the drain port opener, and the drain seal remains in the closed position.

The variable restrictor 220 provides a restricted, low-flow, fluid path between the system fluid supply and the latch chamber. Equivalently or additionally, an alternate low-flow path may be provided bypassing the restrictor, however as such arrangement is considered equivalent to a low-flow path through the restrictor, the following disclosure shall relate to a low-flow option via the restrictor, but the claims should be construed to extend to both arrangements.

The restricted, low-flow fluid path provide two primary advantages: firstly the low flow path will compensate for a small a leak in any of the components downstream therefrom, preventing false tripping of the valve 10 due to such minor leak. Secondly, the restricted flow path will protect the system from false tripping in the case of a transient high pressure in the system, such as in the case of water hammer. During such transient high pressure, the pressure in the valve inlet chamber 102 increases, and the force exerted on the bottom surface 106 of the diaphragm may exceed the force exerted by the fluid in the control chamber. Such condition will cause the valve to needlessly transfer water to the system. Considering low compressibility fluid such as water and other liquids, pressure in a fluid connected volume is essentially equal, so assuming no-flow in the restricted, low-flow path, as long as there is continual fluid coupling between the inlet port and the control chamber any pressure present in the inlet port would be readily reflected as being present in the control valve. Therefore, the force exerted on the top 108 of the membrane will be greater than the force exerted on the bottom 106 of the membrane, and the valve 10 will stay closed.

Figure 4:
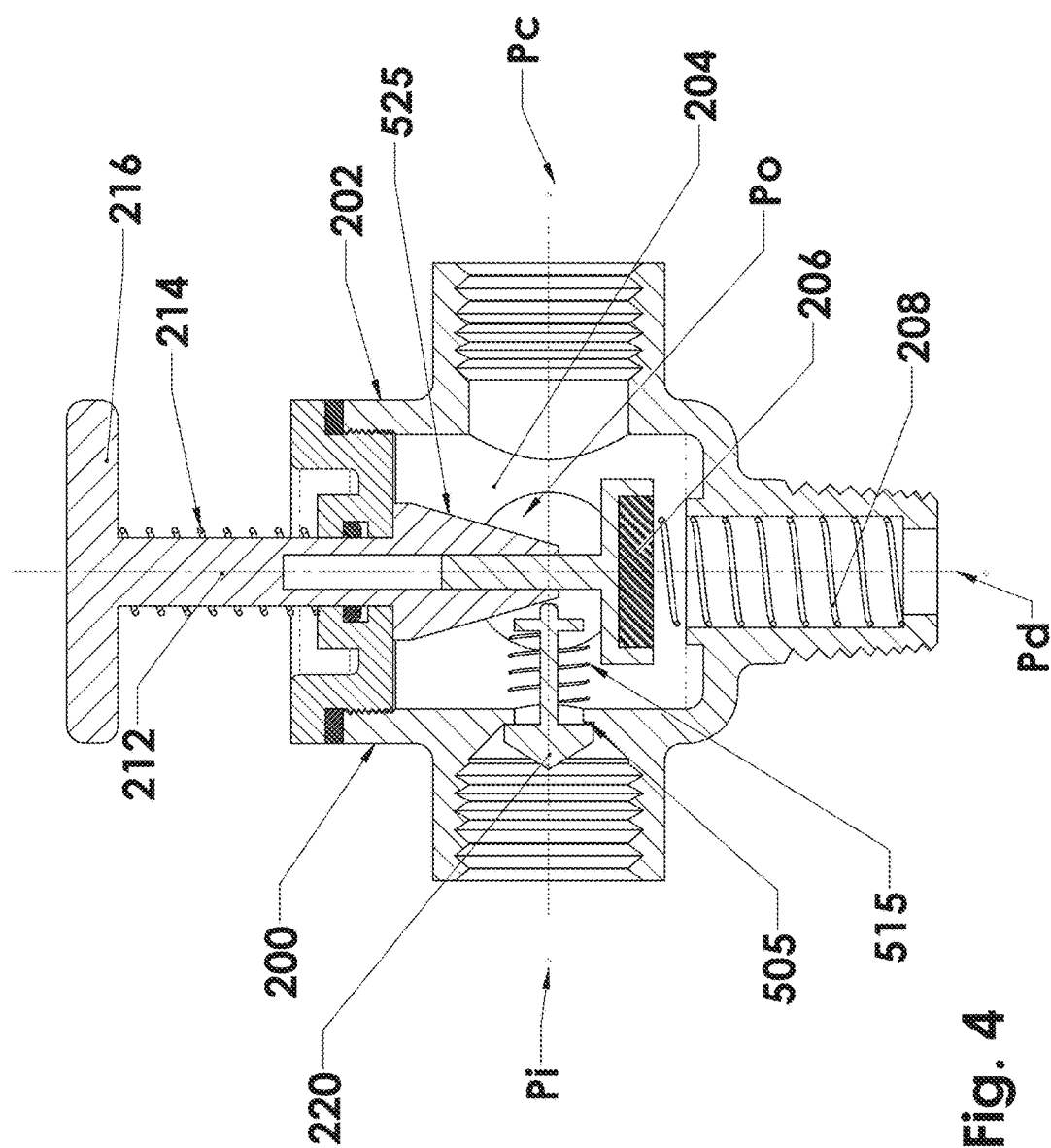
FIG. 4 depicts a cross-cut view off the latch of FIGS. 2 and 3, in activated state.

FIG. 4 depicts the latch of FIGS. 2 and 3 in an activated state. When a fire is detected, the activation device 14 opens and relives the pressure from the base valve 10 control chamber 110, via the activating path which includes the fluid coupling between the control chamber and the outlet port Po, the latch chamber 204, control port Pc, and optionally various connecting vessels such as pipes, and the like. The activation path offers lower flow restriction than the control supply path 112 which couples fluid from the system fluid inlet to the control chamber via the variable restrictor, and therefore pressure in the control chamber will decrease, and the base valve will open to supply fluid for distribution.

As the pressure in the latch chamber 204 decreases, the drain port opener 208 acts against the decreasing force which the fluid in the latch chamber exerts on the top surface of the drain seal, and urges the drain seal 206 to the open position, providing a second path of pressure relief from the latch chamber and thus also from the valve control chamber. The drain path also offers less flow restriction than the control supply path, and therefore the drain path is sufficient to prevent pressure buildup in the valve control chamber. If the activating device 14 closes for any reason, such as a loss of electrical power by way of example, the fluid path provided via the drain port Pd will continue to maintain the base valve 10 in an open state.

It is seen therefore that the path provided by the drain port Pd in the latch active state achieves the objective of maintaining the base valve open if the control path of the activating device becomes blocked, such as will happen by way of example, due to loss of power.

Figure 5:
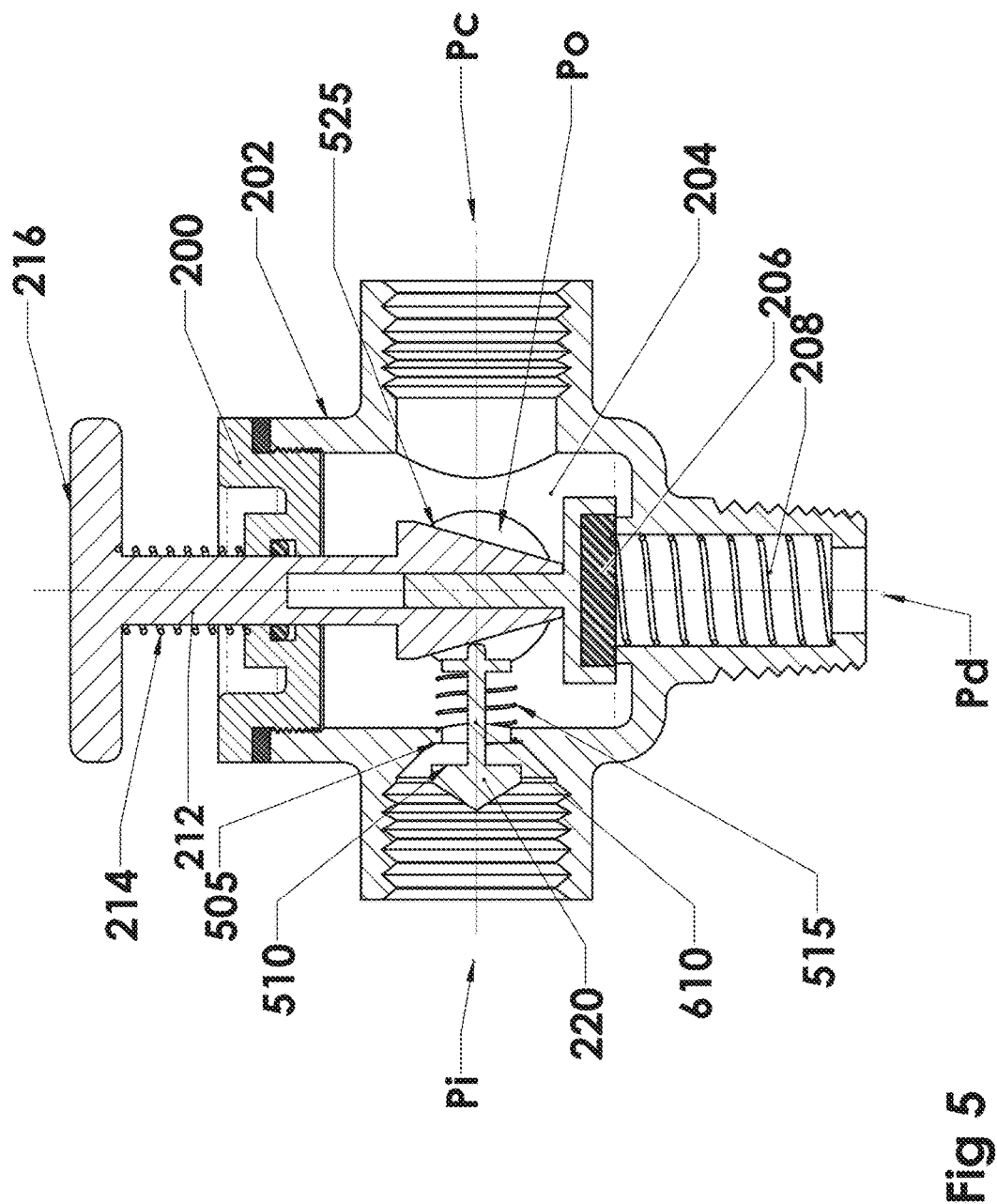
FIG. 5 depicts the latch of FIGS. 2, 3, and 4, in a reset state

FIG. 5 depicts the latch in a reset state. In order to reset the system, the activation device 14 is placed in the closed state, and the plunger 212 is pressed against plunger spring 214, into a reset state. Two actions take place as a result: the restrictor is switched to a higher fluid flow state, and the drain path is closed.

The plunger is coupled to the variable restrictor by any desired link 610. The link may be mechanical such as direct contact, an arm, an actuating link, a gear, and the like. The link may also be hydraulic. Further, the link may reside outside the latch chamber 204 in whole or in part (not shown). Activating the plunger to reset the latch increases flow through the restrictor, which speeds up the filling of the control chamber 110, shortening the time required for a reset. The plunger also pushes the drain seal against the drain port opener 208, and sets the drain seal 206 back to a closed position. When the pressure in the latch chamber 204 is sufficiently high to maintain the drain seal in the closed position, the plunger may be released, and the latch reverts to its standby state. While it is desirable maintain the plunger activating the restrictor at high flow state, doing so is not mandatory: the primary fluid will continue to flow until the control chamber fills and the valve closes.

The restrictor may be embodied in numerous ways. As described above, some embodiments utilize a restrictor valve 220, either as a primary flow restrictor in the control supply path 112 or in addition to any other flow restriction. FIGS. 6A and 6B depict one embodiment of such restrictor valve acting as a variable flow impediment to limit fluid flow between the input port and the control chamber, either directly or indirectly.

Restrictor valve 220 comprises a seat 505 and a inlet port seal 510. The seat is in the control supply path, and in this embodiment is at the area between the inlet port Pi and the latch chamber 204. During the latch standby state, and in many embodiments during the latch activated state, the seal is urged against the seat by a spring 515, as seen in FIG. 6A. The restrictor valve thus impedes and restricts fluid flow from the input port to the latch chamber, and from there to the valve 10 control chamber 110.

The restricted flow path between the inlet port Pi and the control chamber 110 when the restrictor valve is closed may be created by providing a separate fluid passage, or by designing the restrictor valve to have an imperfect seal. Numerous methods of forming a restricted flow path are known in the art. By way of example a small notch 615 may be formed in the restrictor valve seat or seal, a small hole may be provided in the seal 510, a limiter may be disposed to prevent complete closure of the restrictor valve, a bypass passage may be provided, and the like. Operationally, when the restrictor valve is open the flow restriction between the inlet port Pi and the control chamber 110 is lower than when the restrictor valve is closed.

In this embodiment the plunger 212 has a tapered or otherwise enlarged portion 525, referred to hereinafter as the plunger cone, regardless of the actual shape. The cone 525 is disposed in the latch chamber. The restrictor valve seal has a link portion 610 which extends into the latch chamber and is mechanically contacting the plunger cone. The link 610 is disposed such that moving the plunger to the reset position will cause opening of the restrictor valve, as shown in FIG. 6B. The opened restrictor valve increases fluid flow from the inlet port Pi to the latch chamber and from there by way of the outlet port Po to the valve control chamber 110. The opening of the restrictor valve shortens the time required to increase the pressure in the valve control chamber 110 causing a relatively rapid closure of the base valve 10. The increased pressure will also act on the drain seal 206 while it is being held in the closed position by the plunger, and provide pressure to maintain the drain seal in the closed state against the urging of the drain port opener 208. When the plunger is released, spring 214 urges it to its standby position. As the cone does not exert pressure on the restrictor valve link 610, the restrictor valve spring 515 urges the restrictor valve seal against the seat 505, and the restrictor valve closes. If a flow exists in the system downstream from the restrictor water pressure in the inlet port Pi will also act to close the restrictor valve seal. The pressure in the latch chamber 204 maintains the drain seal 206 in a closed state and thus the system as a whole returns to its standby state, and is ready for the next activation. Notably, the restrictor in the embodiment depicted in FIGS. 6A and 6B functions as a check valve.

The skilled in the art would recognize many other ways to provide the variable restriction, and to couple it to the plunger or other reset mechanism. By way of example an external valve may be mechanically, hydraulically, or electrically coupled to the plunger, the external valve providing fluid coupling therethrough between the inlet port and the latch chamber.

While the example provided above is described in terms of utilizing the primary fluid and coupling the inlet port Pi, and thence the valve control chamber 110, to the primary fluid supply present in the valve inlet chamber 102, it is noted that pressurized fluid from any convenient source may be coupled to the inlet port, as long as the pressure is sufficient to ensure proper operation.

The plunger 212 may be operated manually, or remotely by a link (not shown) which may be mechanical, electrical, hydraulic, or a combination thereof.

the skilled in the art will recognize that while the describe embodiments are directed at a firefighting system, the manual latch may be utilized to provide manual reset of a any system utilizing valves having a fluid control chamber, and the invention extend to such systems.

FIG. 7 depicts a simplified diagram showing various portions of the invention embodied in discrete units. This figure comes to show that in certain embodiments one or more of the system components shown in FIGS. 1-6B may be implemented separately from the latch body. Base valve 800 is disposed to control flow between a fluid inlet 804 and a fluid outlet 808. In a typical system the fluid inlet is coupled to a water supply and the fluid outlet is coupled to a water distribution system such as a sprinkler system, and the like. Base valve 800 has a control mechanism 813 which when sufficient pressure is applied thereto maintains the base valve closed, and which allows the valve to open, or opens the valve when the pressure is reduced below a certain level. By way of example the control mechanism may be a diaphragm, a piston, and the like. A restricted flow path 812 comprises a variable flow restrictor 810 which is coupled between the fluid inlet, and the control mechanism. The control mechanism is further in fluid coupling with an activating device 840, and with a latch 820. When the system is in standby state both the activating device and the latch are closed.

When a system is activated, such as because of a fire, activating device 840 opens, and the pressure in the control mechanism drops, as the fluid path 814 draining the fluid from the control mechanism has lower fluid flow than the fluid flow through the activating fluid path 114 is larger than the flow in the restricted fluid flow path 812 due to the restriction of variable restrictor 810, and the base valve is opened. When the fluid pressure in the latch 820 falls, the latch opens a second drain path via drain port Pd, thus maintaining the valve open even if the activating device 840 reverts to closed state.

When the fire is extinguished or the test completed the system is reset by closing the activating device 840, and by activating the latch plunger 816. Latch plunger 816 urges a drain seal into a closed state, and by a link 850, reduces the flow restriction of the variable flow restrictor. The resulting higher fluid flow fills the control mechanism faster than it would have without restriction reduction. As pressure builds in the control mechanism and the latch the pressure holds the drain seal and the system reverts to standby state once the plunger is freed.

Link 850 may be mechanical, such as a lever, a cable, a rod, or any other kind mechanical connection. In certain embodiments the coupling between the variable restrictor and the latch activation may also be hydraulic, pneumatic, electrical, and the like. It is further noted that the flow restrictor may be embedded in a valve which can be open or closed. In some embodiments the flow restrictor comprises a valve and a narrow passage connected in parallel thereto. However various aspects of the invention offer the feature of fast fill of the hydraulic base valve control chamber by reducing flow restriction into the valve control mechanism during reset of the latch.

Optionally, an alarm sensor 870 is coupled to the fluid drain.

It will be appreciated that the invention is not limited to what has been described hereinabove merely by way of example. While there have been described what are at present considered to be the preferred embodiments of this invention, it will be obvious to those skilled in the art that various other embodiments, changes, and modifications may be made therein without departing from the spirit or scope of this invention and that it is, therefore, aimed to cover all such changes and modifications as fall within the true spirit and scope of the invention, for which letters patent is applied.

I claim:

1. A manual reset latch comprising:
    a body having an input port, a control port, and a drain port, the ports being in fluid communication with a latch chamber formed at least partially within the body;
    a plunger having at least a portion thereof disposed in the body, the plunger being movable between at least a standby state and a reset state;
    a drain seal disposed to move between a closed position wherein the drain seal impedes fluid flow between the latch chamber and the drain port, and an open position wherein the drain seal allows fluid flow between the latch chamber and the drain port, the drain seal having a top surface operationally exposed to pressure within the latch chamber and a sealing surface, such that while in the closed position the pressure within the latch chamber urges the drain seal to the closed position;
    the drain seal being urged to the open position by a drain seal opener, the drain seal further being disposed such that placing the plunger in a reset state will urge the drain seal to the closed position;
    a variable flow restrictor disposed to limit fluid flow from the inlet port into the latch chamber, the flow restrictor being coupled directly or indirectly to the plunger at least when the plunger is in the reset state, the flow restrictor presenting a lower fluid flow resistance when the plunger is in the reset state than when the plunger is in the standby state.

2. A latch as claimed in claim 1, wherein the drain seal opener comprises a spring urging the drain seal against pressure in the latch chamber.

3. A latch as claimed in claim 1, wherein the flow restrictor forms a fluid path therethrough at least during standby state and reset state.

4. A latch as claimed in claim 1, wherein the flow restrictor is integral to the latch.

5. A latch as claimed in claim 1, wherein the flow restrictor is selected from a group consisting of needle valve, a reed, a gate valve, a tapered needle longitudinally movable in a corresponding tapered passage, and any combination thereof.

6. A latch as claimed in claim 1, wherein the plunger comprises an enlarged section which couples to the variable flow restrictor at least when the plunger is in the reset state, to urge the flow restrictor to a state of low restriction.

7. A latch as claimed in claim 6, wherein the enlarged section is tapered, with a narrow end pointing towards the drain seal.

8. A latch as claimed in claim 1 further comprising an outlet port in fluid communication with the latch chamber.

9. A reset latch comprising:
    a body having an input port, a control port, and a drain port, the ports being in fluid communications with a latch chamber formed at least partially within the body;
    a plunger having at least a portion thereof disposed in the body, the plunger being movable between at least a standby state and a reset state;
    a drain seal disposed to move between a closed position wherein the drain seal impedes fluid flow between the latch chamber and the drain port, and an open position wherein the drain seal allows fluid flow between the latch chamber and the drain port, the drain seal having a top surface operationally exposed to pressure within the actuator chamber and a sealing surface, such that while in the closed position the pressure within the latch chamber urges the drain seal to the closed position;
    the drain seal being urged to the open position by a drain seal opener, the drain seal further being disposed such that placing the plunger in a reset state will urge the drain seal to the closed position; and, a variable flow restrictor disposed outside the latch body the variable flow restrictor being operational to limit fluid flow from the inlet port into the latch chamber, the flow restrictor being coupled to the plunger at least when the plunger is in the reset state, the flow restrictor presenting a lower fluid flow resistance when the plunger is in the reset state than when the plunger is in the standby state.

10. A latch as claimed in claim 9, wherein the variable flow restrictor further comprises an orifice.

11. A manual reset latch comprising:
a body having an outlet port, a control output port, and a drain port, the ports being in fluid communication with a latch chamber formed at least partially within the body;
a plunger having at least a portion thereof disposed in the body, the plunger being movable between at least a standby state and a reset state;
a drain seal disposed to move between a closed position wherein the drain seal impedes fluid flow between the latch chamber and the drain port, and an open position wherein the drain seal allows fluid flow between the latch chamber and the drain port;
a drain seal opener operative to urge the drain seal to the open position;
a variable flow restrictor disposed to limit fluid flow from an inlet to a fire fighting system valve control chamber, the variable flow restrictor being operationally coupled to the plunger, such that moving the plunger to the reset state causes the drain seal to be urged to the closed position and the flow restrictor to lower fluid flow resistance between the inlet and a control mechanism of a valve;
wherein the drain seal is urged to the open position by the drain seal opener when the pressure in the latch chamber falls below a predetermined level, and wherein the valve control chamber is in fluid communications with the latch chamber.

12. A latch as claimed in claim 11, wherein the flow restrictor forms a fluid path therethrough at least during the standby state and the reset states.

13. A latch as claimed in claim 11 wherein the flow restrictor is integral to the latch.

\* \* \* \* \*